United States Patent
Mita

(10) Patent No.: US 6,891,336 B1
(45) Date of Patent: May 10, 2005

(54) HIGH PRESSURE DISCHARGE LAMP LIGHTING APPARATUS AND LUMINAIRE USING THEREOF

(75) Inventor: Kazutoshi Mita, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 10/668,262

(22) Filed: Sep. 24, 2003

(30) Foreign Application Priority Data

Sep. 24, 2002 (JP) .................................. P2002-276773
Jan. 17, 2003 (JP) .................................. P2003-009152

(51) Int. Cl.$^7$ ............................................. H05B 37/02
(52) U.S. Cl. ...................... 315/224; 315/307; 315/360; 315/DIG. 7
(58) Field of Search ...................... 315/200 R, 209 R, 315/224–226, 244, 291, 307–308, 246, 283, 287, 360, DIG. 5, DIG. 7

(56) References Cited

U.S. PATENT DOCUMENTS

| | | | | |
|---|---|---|---|---|
| 5,063,490 A | * | 11/1991 | Maehara et al. ............... | 363/37 |
| 5,491,386 A | * | 2/1996 | Eriguchi et al. ......... | 315/209 R |
| 5,569,984 A | * | 10/1996 | Holtslag ..................... | 315/307 |
| 5,623,187 A | * | 4/1997 | Caldeira et al. ............. | 315/307 |
| 5,828,185 A | * | 10/1998 | Fellows et al. ............. | 315/246 |
| 5,914,572 A | * | 6/1999 | Qian et al. ................... | 315/307 |
| 5,936,358 A | * | 8/1999 | Okamoto et al. ........... | 315/248 |
| 5,998,939 A | * | 12/1999 | Fellows et al. ............. | 315/246 |
| 6,686,703 B2 | | 2/2004 | Erhardt et al. .............. | 315/247 |
| 2002/0192391 A1 | * | 12/2002 | Wada et al. ................ | 427/508 |

FOREIGN PATENT DOCUMENTS

| | | |
|---|---|---|
| JP | 2000-58284 | 2/2000 |
| JP | 2002-42732 | 2/2002 |

\* cited by examiner

*Primary Examiner*—Thuy Vinh Tran
(74) *Attorney, Agent, or Firm*—Pillsbury Winthrop Shaw Pittman, LLP

(57) ABSTRACT

A high-pressure discharge lamp lighting apparatus including a DC power source, an inverter, and a resonator is presented. The apparatus also includes an inverter controller for controlling the inverter according to its variable frequency oscillation function by selectively impressing a first frequency in a stable operation window free from causing acoustic resonance in the high-pressure discharge lamp, and a second frequency higher than the first frequency to the inverter, a lamp wattage detector, and a time ratio controller for controlling a time ratio of an operation time at the first frequency and an operation time at the second frequency so that the inverter outputs are alternately impressed to the high-pressure discharge lamp at an adequate time at the first frequency and the second frequency. The time ratio is based on a lamp voltage of the discharge lamp detected in the steady lighting state using the lamp wattage detector.

18 Claims, 14 Drawing Sheets

HIGH PRESSURE DISCHARGE LAMP LIGHTING APPARATUS AND LUMINAIRE USING THEREOF

CROSS-REFERENCES TO RELATED APPLICATIONS

This application is based upon and claims the benefit of priority from the prior Japanese Patent Applications JP2002-276773 filed on Sep. 24, 2002 and JP2003-9152 filed on Jan. 17, 2003, the entire contents of which are incorporated herein by reference.

FIELD OF THE INVENTION

The present invention relates to a high-pressure discharge lamp lighting apparatus for lighting a high-pressure discharge lamp with a high-frequency alternate-current (hereinafter, abbreviated as AC). Moreover, the present invention relates to a luminaire using such a high-pressure discharge lamp lighting apparatus.

BACKGROUND OF THE INVENTION

Generally, a discharge lamp lighting apparatus is provided with an inverter and an LC resonator. At the time of starting a discharge lamp, the inverter is driven at a very high frequency. A high-frequency AC power obtained by the operation of the inverter is impressed to a discharge lamp via an LC resonator. The frequency of the AC power output is then gradually lowered close to a resonance frequency of the LC resonator. Thereby, the operation frequency of the inverter matches with the resonance frequency of the LC resonator, and the voltage impressed to a discharge lamp rises to maximum. When the impressed voltage reaches a glow-discharge starting voltage of the discharge lamp in the course of the output frequency of the LC resonator closing to the resonance frequency of the LC resonator, the discharge lamp starts a glow discharge. After that, when the output frequency reaches the resonance frequency of the LC resonator, the glow discharge transfers to an arc discharge, and thus the discharge lamp is lit up. After the discharge lamp has been lit up, the frequency of the inverter is further lowered so as that the discharge lamp is steadily lit up at a frequency not involving acoustic resonance in the discharge lamp.

On the other hand, the applied voltage must be kept high for an adequate time to ensure the glow discharge to arc discharge transition of the high-pressure discharge lamp. A prior art, Japanese laied-open patent application JP2000-58284, discloses discharge lamp ballast having a booster provided in preceding the inverter. In a starting operation, the booster boosts up the applied voltage higher than a steady lighting voltage for starting the operation of the high-pressure discharge lamp. During that the high-pressure discharge lamp is steadily lighting, lamp power is adjusted near a rated power by the output voltage of the booster.

There exists an astable operation window, i.e., a frequency zone where an acoustic resonance occurs in the high-pressure discharge lamp. Thereby, at the time of starting as well as during a steady lighting state, the high-pressure discharge lamp is started and lit up at a frequency in a stable operation window, i.e., a frequency zone where an acoustic resonance never occurs in the high-pressure discharge lamp. Another prior art, Japanese laied-open patent application JP2002-42732, discloses a high-pressure discharge lamp having an arc tube with a sphericity of 0.53 to 0.84, an inner diameter of 2.0–6.0 mm, and a plurality of stable operation windows, i.e., frequency zones which are free from causing acoustic resonance.

By the way, at the time of starting the high-pressure discharge lamp it is necessary to impress voltage higher than a steady lighting voltage. It is also necessary to keep a lamp voltage around the rated power of the lamp by a booster during the steady lighting state of the high-pressure discharge lamp. Therefore, there are problems increasing in cost and size, correspondingly.

SUMMARY OF THE INVENTION

An object of the present invention is to provide a high-pressure discharge lamp lighting apparatus, which is able to appropriately control lamp wattage without boosters.

A high-pressure discharge lamp lighting apparatus according to a first aspect of the present invention is characterized by comprising a DC power source, an inverter for converting a DC supplied from the DC power source to an AC, an AC path for transmitting the AC output from the inverter to a high-pressure discharge lamp, a resonator having a predetermined resonance frequency, and interposed in the AC path, an inverter controller for controlling the inverter according its variable frequency oscillation function by selectively impressing a first frequency in the stable operation window free from causing acoustic resonance in the high-pressure discharge, and a second frequency higher than the first frequency to the inverter, a lamp wattage detector for detecting the lamp wattage of the high-pressure discharge lamp from a voltage across the high-pressure discharge lamp and a current flowing through the high-pressure discharge lamp and a time ratio controller for controlling a the time ratio based on a lamp voltage of the discharge lamp detected in the steady lighting state using a lamp wattage detector so as that the inverter outputs at the first frequency and the second frequency are alternately impressed to the high-pressure discharge lamp at an adequate time.

In the present invention and each invention described below, the terms are defined to have the following technical meanings, unless otherwise specified.

The direct-current (hereinafter, abbreviated as DC) power source converts a commercial AC supplied externally to a DC by rectifying the commercial AC with a rectifier. The rectifier is comprised of, e.g., a diode-bridge and a smoothing capacitor coupled in parallel with the diode-bridge. The rectifier may be either of a full-wave-rectifier type, a voltage doubling rectifier type, a half-wave rectifier type and etc. Although it is typical that the DC power source is of converting commercial AC into DC like the one, the DC power source may be of directly yielding DC, like batteries. The inverter may be configured, for example in a half-bridge type circuit comprising two switching elements. Those switching elements complementarily turn ON and OFF at a high-frequency. Therefore, the DC applied to the inverter is converted into the high-frequency AC. The high-frequency AC is supplied to the high-pressure discharge lamp through the resonator. The inverters may be configured in not only the half-bridge circuit, but also in either of a constant current push-pull circuit, a single transistor circuit, a full-bridge circuit, etc.

The high-pressure discharge lamp may be either of a mercury lamp, a metal halide lamp, a high-pressure sodium lamp, etc. For example, alumina ceramics are used as a material for the arc tube of the high-pressure discharge lamp. The resonator is comprised of an inductor and a capacitor.

The high-frequency AC flowing through the resonator becomes maximum in voltage when it takes a frequency around the resonance frequency of the resonator.

The time ratio controller controls the ratio of the operating time at the first frequency free from causing an acoustic resonance in the high-pressure discharge lamp and the operating time in the second frequency higher than the first frequency. In a normal way of lighting discharge lamps at an inductive condition, a high lighting frequency results in a low lamp power, while a low lighting frequency results in a high lamp power. Therefore, a high ratio of the operating time at a high frequency results in the low lamp power, while a high ratio of the operating time at a low frequency results in the high lamp power.

The inverter controller has a variable frequency oscillation function. Thereby, the inverter controller controls the operation frequency of the inverter by selectively impressing a frequency in the stable operation window free from causing the acoustic resonance in the high-pressure discharge lamp (hereinafter, referred to as a first frequency), and a second frequency higher than the first frequency to the inverter. The time ratio controller controls the time ratio based on a lamp voltage of the discharge lamp detected in the steady lighting state using a lamp wattage detector. Thereby, inverter outputs at the first frequency and the second frequency are alternately impressed to the high-pressure discharge lamp at an adequate time.

According to this aspect of the present invention, the ratio of the operation time at the first frequency and the operation time at the second frequency can be adjusted to adequately control the lamp power. Consequently, boosters are not necessary. Furthermore, the high-pressure discharge lamp lighting apparatus can be reduced cost and size thereof, and also simplified its construction.

A high-pressure discharge lamp lighting apparatus according to a second aspect of the present invention is characterized by that the second frequency is contained in another stable operation windows free from causing the acoustic resonance in the high-pressure discharge lamp. According to this aspect of the present invention, an occurrence of the acoustic resonance in a high-pressure discharge lamp can be prevented more definitely.

A high-pressure discharge lamp lighting apparatus according to a third aspect of the present invention is characterized by that the frequency in an astable operation window in which acoustic resonance occurs in the high-pressure discharge lamp.

According to this aspect of the present invention, options of the second frequency can be highly increased. Therefore, the flexibility of designing the high-pressure discharge lamp lighting apparatus increases.

When one of the frequencies is contained in a stable operation window, neither a curvature of arc nor a flickering occurs, even though the other frequency is the frequency of causing acoustic resonance. As the lamp current at the first frequency is larger than the lamp current at the second frequency, a curvature of arc or a flickering becomes hard to occur.

A high-pressure discharge lamp lighting apparatus according to a fourth aspect of the present invention is characterized by that the second frequency generally agrees with the resonance frequency of the resonator.

According to this aspect of the present invention, the high-pressure discharge lamp lighting apparatus can output a sufficiently high voltage. Therefore, unintentional turn-out of the high-pressure discharge lamp resulted from lowering of the lamp power can be prevented.

A high-pressure discharge lamp lighting apparatus according to a fifth aspect of the present invention is characterized by that at the time of starting the high-pressure discharge lamp, the inverter is operated at a frequency generally corresponding to the resonance frequency of the resonator.

In this aspect of the present invention, in a starting operation, the high-pressure discharge lamp is operated at the resonance frequency of the resonator preferably in the inductive condition and in the stable operation window wherein the lamp power is suppressed in low. According to this aspect of the present invention, the high-pressure discharge lamp can be lit up immediately after starting the high-pressure discharge lamp at the frequency in the stable operation window which can control lamp power low. Therefore, the stress resulting from the curvature of arc etc. does not occur in the arc tube of a high-pressure discharge lamp immediately after starting.

A high-pressure discharge lamp lighting apparatus according to a sixth aspect of the present invention is characterized by that in the time ratio controller the ratio of the operation time at the first frequency is set in the range of 10–100%. This is given from a viewpoint of the sphericity of arc tube which is available at a normal industrial productivity level.

The situation of acoustic resonance depends on the sphericity of arc tube. As the sphericity of arc tube increases, the ratio of the operating time at a frequency in a stable operation window can be decreased. The limit of the sphericity of arc tube, which can be attained on an industrial production level, is 0.6 in general, and the ratio of the frequency in a stable operation window should be equal to or higher than 10%. Therefore, the ratio of the first frequency can be set in a range of 10–100%.

A high-pressure discharge lamp lighting apparatus according to a seventh aspect of the present invention is characterized by that the lamp power W1 during lighting at the first frequency and the lamp power W2 during lighting at the second frequency are related by an equation of $W1/W2 \geq 2.0$.

In this aspect of the present invention, the time difference between the operating time in the first frequency and the operating time in the second frequency relatively decreases. Therefore, the fluctuation of the lamp power during lighting can be decreased. According to this aspect of the present invention, the ratio of the operating time at the first frequency increases. Therefore, it becomes possible to turn on a high-pressure discharge lamp stably.

A high-pressure discharge lamp lighting apparatus according to an eighth aspect of the present invention is characterized by that the two-operations alternating frequency is defined in higher than 100 Hz but lower than the first frequency.

In this aspect of the present invention, since the two-operations alternating frequency is set to 100 Hz or more, the ripple of the lamp current beyond is beyond human visibility in great deal and thus flickers of the discharge lamp are not sensed by human eyes. According to this aspect of the present invention, since the two-operations alternating frequency is made lower than into the first frequency, the lamp power can be appropriately controlled.

A high-pressure discharge lamp lighting apparatus according to a ninth aspect of the present invention is characterized by that the time ratio controller controls the time ratio so as that the lamp voltage of the high-pressure discharge lamp does not exceed a voltage at the time that the lamp power becomes maximum in the operating at the first frequency.

A high pressure discharge lamp lighting apparatus of an LC resonance type has properties of that during lighting at a certain frequency the lamp power serves as maximum with a certain lamp voltage, and lamp power serves as zero in the state of a load short circuit state and downstream disconnection, when operating on fixed frequency.

In the lighting at the first frequency, the inverter more and more goes to a capacitive oscillation, as the lamp voltage increases. So that, the switching loss of the inverter increases, and the efficiency of the inverter gets worse. Thereon, the time ratio control is carried out unless the lamp voltage exceeds a voltage at the time that the lamp power becomes maximum during operation at the first frequency. In case of lighting a high-pressure discharge lamp whose lamp voltage exceeds such a voltage, the high-pressure discharge lamp is lit up at a frequency in a second stable operation window which is higher than the first stable operation window.

According to this aspect of the present invention, even if the high-pressure discharge lamp having a high lamp voltage it is able to prevent a capacitive oscillation during the time ratio control and a degradation of efficiency due to a switching loss.

A high-pressure discharge lamp lighting apparatus according to a tenth aspect of the present invention is characterized by that the resonance frequency of the resonator is set in two to three times the first frequency, and the time ratio controller controls the time ratio so as that the lamp voltage does not exceed a voltage at the time that the lamp voltage in the operation at the second frequency reaches a prescribed value.

When a high-pressure discharge lamp is started at a frequency in two to three times the frequency during lighting and the resonance frequency of the resonator is set for the starting frequency, even if the lamp voltage increases in the first frequency the operation of the inverter becomes a tertiary resonance state. Therefore, the inverter is prevented from a capacitive oscillation. Then, even if the lamp voltage is the high-pressure discharge lamp which becomes higher than or equal to a voltage in case lamp power becomes maximum by the operating state in the first frequency, time ratio control is performed. In this case, in a time ratio controller, the lamp voltage operates in the range which does not exceed voltage in case lamp power serves as an adequate value by the operating state in the second frequency. This is because it becomes impossible to maintain lamp power to the adequate value when the lamp voltage becomes higher than or equal to a voltage in case lamp power serves as an adequate value by the operating state in the second frequency.

According to this aspect of the present invention, even the high-pressure discharge lamp which has the lamp voltage higher than the lamp voltage from which lamp power becomes maximum by the operating state in the first frequency, the time ratio control can be performed, and the possible range of time ratio control can be made large.

A high-pressure discharge lamp lighting apparatus according to an eleventh aspect of the present invention is characterized by that the time ratio controller starts after the inverter has started. A high-pressure discharge lamp lighting apparatus according to a twelfth aspect of the present invention is characterized by that the DC power source has a rectifier for rectifying a commercial AC power, and the time ratio controller is supplied its operation power from a smoother associated to the rectifier. A high-pressure discharge lamp lighting apparatus according to a thirteenth aspect of the present invention is characterized by that the time ratio controller is supplied its operating power from the resonator.

It is made, as for these three modes, for a time ratio controller to operate after initiation of the inverter of operation. According to these three aspects of the present invention, the time ratio controller is held non-operating state until the high-pressure discharge lamp is lit up. Therefore, the high-pressure discharge lamp lighting apparatus can optimally change the lamp power of the high-pressure discharge lamp until it results in lighting.

A high-pressure discharge lamp lighting apparatus according to a fourteenth aspect of the present invention starts the operation after initiation of the inverter controller of operation.

A high-pressure discharge lamp lighting apparatus according to a fifteenth aspect of the present invention is characterized by that the time ratio controller and the inverter controller have their own power sources with different start-up times, and their start timings are adjusted by the differences of those start-up times.

A time ratio controller is made to carry out initiation of operation of these two aspects of the present invention after starting the inverter controller. The electric power which can be supplied to a high-pressure discharge lamp depending on the size of lighting frequency immediately after a high-pressure discharge lamp starts decreases. Immediately after starting, when there is little supply capability to a high-pressure discharge lamp, heating of an electrode is not enough and electrode weld slag occurs. Then, a high-pressure discharge lamp is started by the inverter controller, and after heating of an electrode is fully performed, a time ratio controller is started. The timing of the inverter controller or a time ratio controller of operation is managed at the standup speed of a respectively individual drive power source.

According to these two aspects of the present invention, a time ratio controller is driven after oscillation initiation of the inverter controller. Therefore, the lamp power varies along with an optimal progress until the high-pressure discharge lamp is completed.

A high-pressure discharge lamp lighting apparatus according to a sixteenth aspect of the present invention is characterized by that an operating power of the inverter controller is supplied from a switching snubber associated to the inverter, and an operating power of the time ratio controller is supplied from a smoother associated to a rectifier of the DC power source. A high-pressure discharge lamp lighting apparatus according to a seventeenth aspect of the present invention is characterized by that an operating power of the inverter controller is supplied from the switching snubber associated to the inverter, and an operating power of the time ratio controller is supplied from the resonator.

A capacitor serving for the switching snubber of the inverter carries out charging and discharging in synchronization with the operations of the switching elements. The operating power of the inverter controller is achieved by using current flowing in the switching snubber. On the other hand, when it is so constituted that an operating power is achieved by using the smoother of the rectifier, the smoothing capacitor carries out charging and discharging so as that the charging current and the discharging current are able to secure the operating power enough for operating the time ratio controller after the operating power of the inverter has increased. Therefore, the time ratio controller can be turned on after the lamp power has relatively increased. It is also possible to use a current flowing in the capacitor constituting the resonator for the operating power of the time ratio controller. In this case, there is a fear of that a large amount of current flows in the capacitor constituting the resonator at the time of starting the discharge lamp and thus the time ratio controller is operated too early than usual. Therefore, in this case a delay circuit can be used for eliminating the fear of early operation of the time ratio controller.

According to these two aspects of the present invention, the inverter controller and the time ratio controller can be supplied their operating powers from the circuit constituting the high-pressure discharge lamp lighting apparatus. Therefore, the inverter controller and the time ratio controller can be simplified their circuit configurations, and are able to start their operations at proper timings.

The luminaire according to an eighteenth aspect of the present invention is characterized by it is comprised of a high-pressure discharge lamp lighting apparatus according to either of the first to seventeenth aspect of the present invention, the high-pressure discharge lamp to be lit up with the discharge lamp lighting apparatus and an appliance for accommodating the high-pressure discharge lamp lighting apparatus and the high-pressure discharge lamp. According to this aspect of the present invention, the luminaire has the advantages of the high-pressure discharge lamp lighting apparatus according to either of the first to seventeenth aspect of the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the attached drawings.

Figure 1:
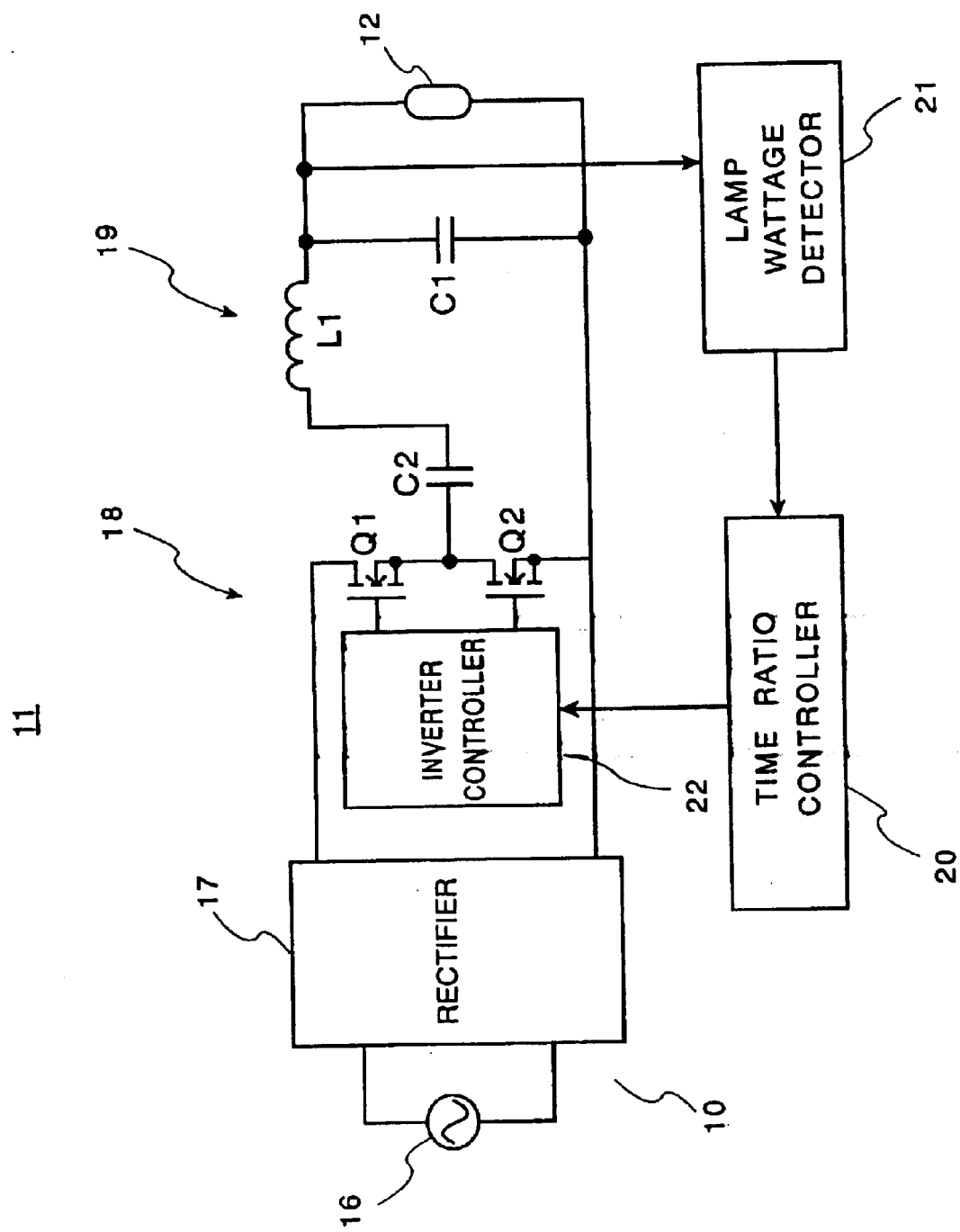
FIG. 1 is a circuit diagram showing one embodiment of the high-pressure discharge lamp lighting apparatus according to the present invention.

FIG. 1 shows a circuit of the high-pressure discharge lamp lighting apparatus 11 according to a first embodiment of the present invention.

Figure 2:
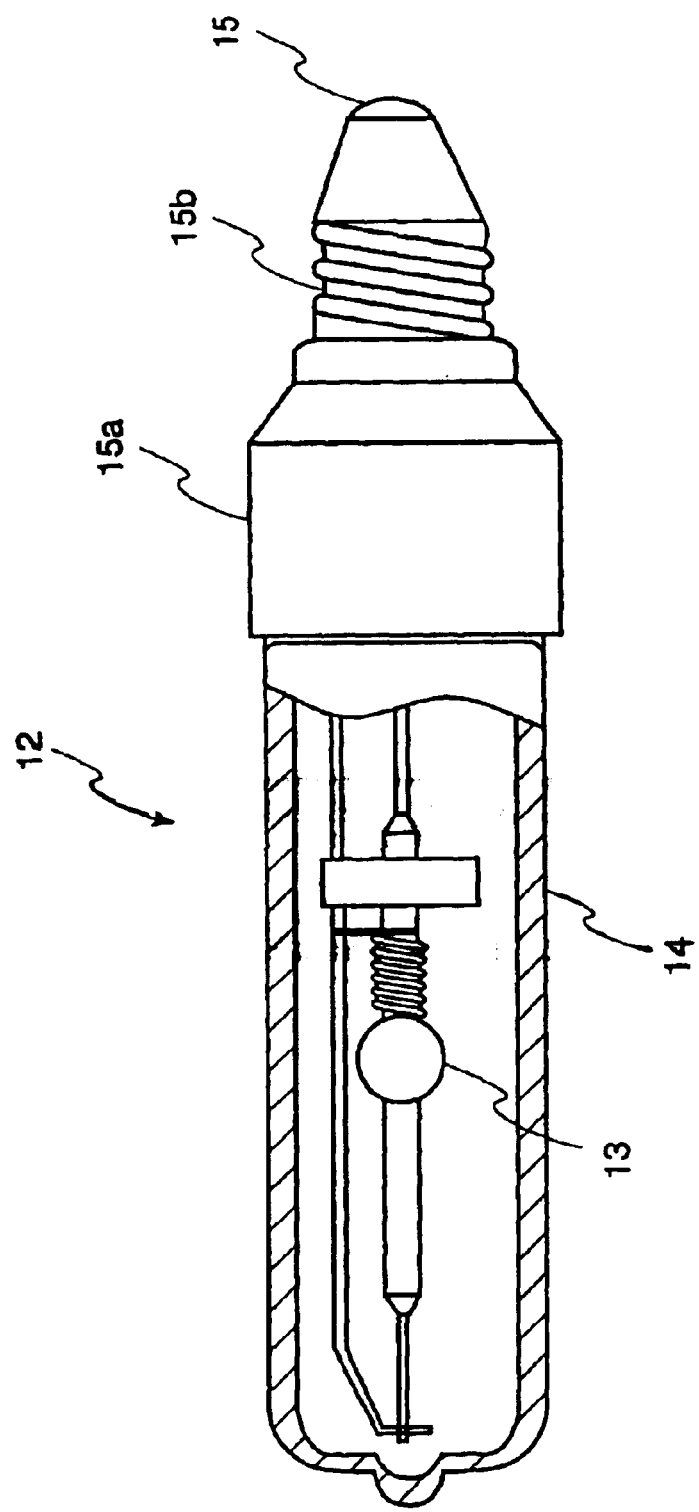
FIG. 2 is a partial section front view showing an exemplified high-pressure discharge lamp capable of being used in the high-pressure discharge lamp lighting apparatus according to the present invention.

FIG. 2 shows an exemplified high-pressure discharge lamp 12 which is able to be used for the high-pressure discharge lamp lighting apparatus according to the present invention.

The high-pressure discharge lamp 12 shown in FIG. 2 is a ceramic metal halide lamp which utilizes translucent alumina for an arc tube 13. The alumina used for the arc tube 13 is thermally and chemically stable against metal halide filled in the arc tube higher than commonly used silica glass. The arc tube 13 is enclosed in the outer bulb 14 whose inside is maintained in a vacuum state, and a bulb base 16 is formed on one end of the outer bulb 14. High-frequency AC voltage is applied from the high-pressure discharge lamp lighting apparatus 11 between a tip end terminal 15a of a bulb base 15 and a side-wall screw terminal 15b.

The arc tube 13 of such a ceramic metal halide lamp 12 has a sphericity of preferably 0.53–0.84, and several frequency zones which are free from acoustic resonance so-called stable operation window. For example, in the ceramic metal halide lamp with a 20 W rated wattage, the arc tube 13 has an inner diameter of 6 mm. Major stable operation windows are 0–20 kHz zone, 40–50 kHz zone, and 80–88 kHz zone.

Referring now to FIG. 1, the high-pressure discharge lamp lighting apparatus 11 for lighting the high-pressure discharge lamp 12 will be explained.

FIG. 1 shows a circuit construction of the high-pressure discharge lamp lighting apparatus 11. A high-pressure discharge lamp lighting apparatus 11 has a DC power source 10 which is comprised of an AC inlet 16 and a rectifier 17. That is, the DC power source 10 outputs a DC by converting or rectifying an AC received through the AC inlet 16 in the rectifier 17. Although a AC to DC converter type DC power source is popular, it may be a direct DC generating type DC power source like a battery. A DC output from the DC power source 10 is input to an inverter 18. The inverter 18 converts the DC into a high frequency AC. The high frequency AC is supplied to a high-pressure discharge lamp 12 passing through an AC path containing the resonator 19.

The inverter 18 is constituted in a half bridge type circuit having two switching elements Q1 and Q2. The inverter 18 converts the DC into a high frequency AC by complementary switching operations of the switching elements Q1 and Q2 at a high frequency. The resonator 19 comprises an inductor L1 and a capacitor C. The resonance frequency of the resonator 19 is set in a very high frequency capable of starting the discharge lamp 12. At the time of starting the discharge lamp 12, the AC at a frequency around the resonance frequency is supplied to the discharge lamp 12 through the resonator 19. At that time, a voltage of the high frequency AC becomes maximum according to the resonance operation of the resonator 19. Then, discharge lamp 12 is lit up.

The inverter 18 is controlled its operation frequency by the inverter controller 22. The inverter controller 22 has an variable frequency oscillation circuit. The switching elements Q1 and Q2 of the inverter 18 carry out the complementary switching operations according to the oscillation frequency. Especially the inverter controller 22 operates the inverter 18 at a frequency generally corresponding to the resonance frequency of the resonator 19 at the time of starting the discharge lamp 12. Consequently, the discharge lamp 12 is started by being impressed the high voltage AC through the resonator 19. After the discharge lamp 12 started, the inverter controller 22 operates the inverter 18 at a first frequency free from causing acoustic resonance and a second frequency higher than the first frequency, by turn. The time ratio controller 20 controls the ratio of the oscillation time at the first frequency and the oscillation time at the second frequency of the inverter controller 22. Consequently, the lamp power of the high-pressure discharge lamp 12 is controlled appropriately. The time ratio controller 20 starts its operation after the inverter 18 started its operation. This is realized by making the start-up time of the time ratio controller 20 longer than the start-up time of the inverter 18. The inverter 18 can perform necessary operations for starting the discharge lamp 12 without affection of the time ratio controller 20 until the discharge lamp 12 has been started.

Figure 3:
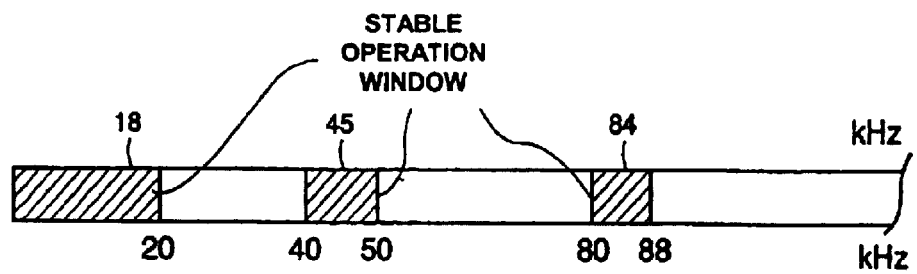
FIG. 3 is a schematic diagram showing exemplified stable operation windows in a ceramic metal halide high-pressure discharge lamp with a 20 W rated wattage.

Referring now to FIG. 3, exemplified stable operation windows of a ceramic metal halide high-pressure discharge lamp with a 20 W rated wattage will be explained. As shown in FIG. 3, the ceramic metal halide lamp has three frequency zones free from causing acoustic resonance, i.e., three stable operation windows; 0–20 kHz zone, 40–50 kHz zone and 80–88 kHz zone. Among those, the 40–50 kHz zone is selected for the first stable operation window, and the 80–88 kHz zone is selected for the second stable operation window. Furthermore, 45 kHz, i.e., the center frequency of the first stable operation window is assigned to the first frequency, and 84 kHz, i.e., the center frequency of the second stable operation window is assigned to the second frequency. The time ratio controller 20 controls the ratio of the operating time at the first frequency, 45 kHz, and the operating time at the second frequency, 84 kHz, so as that the lamp power of the high-pressure discharge lamp 12 becomes an adequate value.

Figure 4:
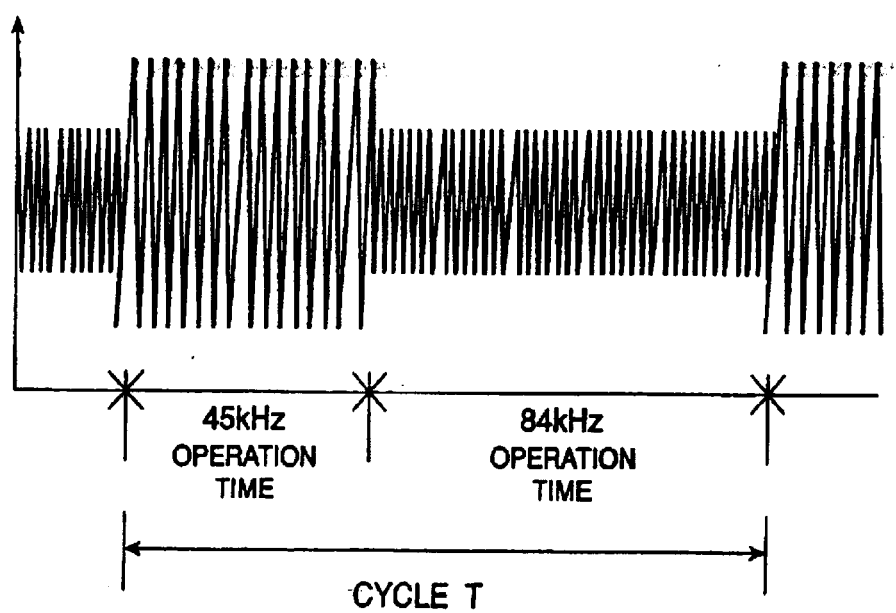
FIG. 4 is a graph for explaining the ratio of the operating times at a first frequency of 45 kHz and a second frequency of 84 kHz.
Figure 5:
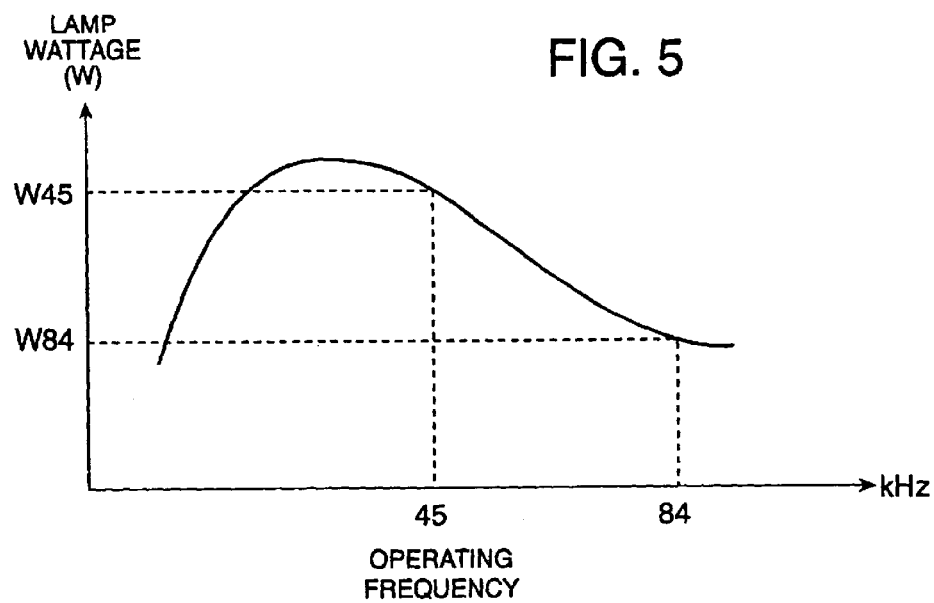
FIG. 5 is a graph showing a relation of a lighting frequency and a lamp power in a high-pressure discharge lamp.
Figure 6:
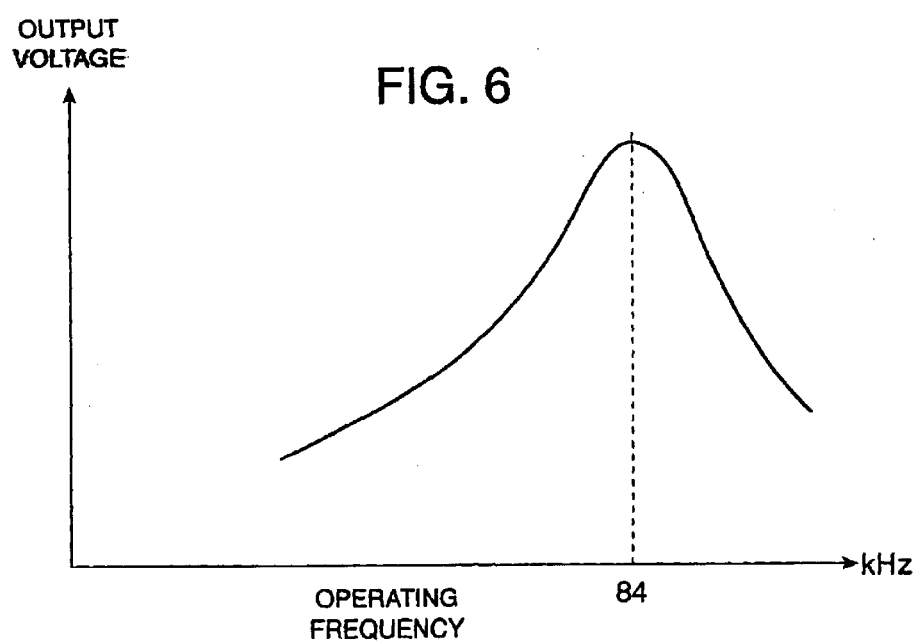
FIG. 6 is a graph showing a relation of an operating frequency and an output voltage of an inverter in a no-load state in the first embodiment of the present invention.

Referring now to FIG. 4, the ratio of the operating time at the first frequency, 45 kHz, and the operating time at the second frequency, 84 kHz will be explained. In an example, as shown in FIG. 4, the operating time at the first frequency, 45 kHz is made shorter than the operating time at the second frequency, 84 kHz. By varying the ratio of the operating time at the first frequency, 45 kHz, and the operating time at the second frequency, 84 kHz, the voltage impressed to the high-pressure discharge lamp 12 and the lamp current thereof are varied. Referring now to FIG. 6, a relation of the lighting frequency and the lamp power of the high-pressure discharge lamp 12 will be explained. As shown in FIG. 5, in the operation at the first frequency, 45 kHz, the lamp power W45 is large in spite of that the lighting frequency is comparatively low. While in the operation at the second frequency, 84 kHz, the lamp power W84 is small in spite of that the lighting frequency is comparatively high. Therefore, the lamp power can be adjusted by varying the ratio of the operating time at the first frequency, 45 kHz, and the operating time at the second frequency, 84 kHz.

Here, a cycle T wherein the operation at the first frequency and the operation at the second frequency alternate is set to a value equal to or higher than 100 Hz and lower than the first frequency, in an expression of frequency corresponding to the cycle T (hereinafter, the frequency is referred to as two-operations alternating frequency). The reason for setting the lower limit of the two-operations alternating frequency to a value equal to or higher than 100 Hz is that human visibility is not sensitive to the ripples of the lamp current caused by such a frequency equal to or higher than 100 Hz, and thus flickers of the discharge lamp are not sensed by human eyes. The reason for setting the upper limit of the two-operations alternating frequency to a value lower than the first frequency is that the lamp power can be appropriately controlled when it is lower than the first frequency.

Although the first lighting frequency is assigned to 45 kHz and the second frequency is assigned to 84 kHz in the above explanation, the first lighting frequency can be assigned to 18 kHz and the second frequency can be assigned to 45 kHz. Or the first lighting frequency is assigned to 18 kHz, and the second frequency can be assigned to 84 kHz.

Referring now to FIG. 6, a relation of the operating frequency and the output voltage of the high-pressure discharge lamp lighting apparatus 11 at a no-load operation state will be explained. In one embodiment, the resonance frequency of the resonator 19 in generally assigned to the central frequency, 84 kHz. As the second frequency is 84 kHz, the high-pressure discharge lamp 12 is supplied with a sufficiently high voltage. Therefore, unintentional turn-out of the high-pressure discharge lamp 12 is prevented. Therefore, the high-pressure discharge lamp 12 is stably lit without causing unintentional turn-out.

At the time of starting the high-pressure discharge lamp 12, the inverter 18 drives the high-pressure discharge lamp 12 at a frequency which is in the second stable operation window free from causing acoustic resonance and generally equal to the capacitive resonance frequency of the resonator 19. According to the resonance operation of the resonator 19, a high voltage is impressed to the high-pressure discharge lamp 12, and thus the high-pressure discharge lamp 12 is started. Therefore, the high-pressure discharge lamp 12 is operated at the 84 kHz inductive frequency in the stable operation window in following the starting operation. Therefore, the arc tube of the high-pressure discharge lamp 12 is not affected by stresses resulting from a curvature of arc etc.

Although in the above embodiment both of the first frequency and the second frequency are assigned to frequencies 45 kHz and 84 kHz respectively in the stable operation windows, the second frequency can be assigned to a frequency which is not in such a stable operation window. In this case, the second frequency is assigned to a value higher than the second stable operation window.

For example, the first frequency is assigned to 45 kHz which is in the first stable operation window, while the second frequency is assigned to 90 kHz which is higher than the second stable operation window.

Figure 7:
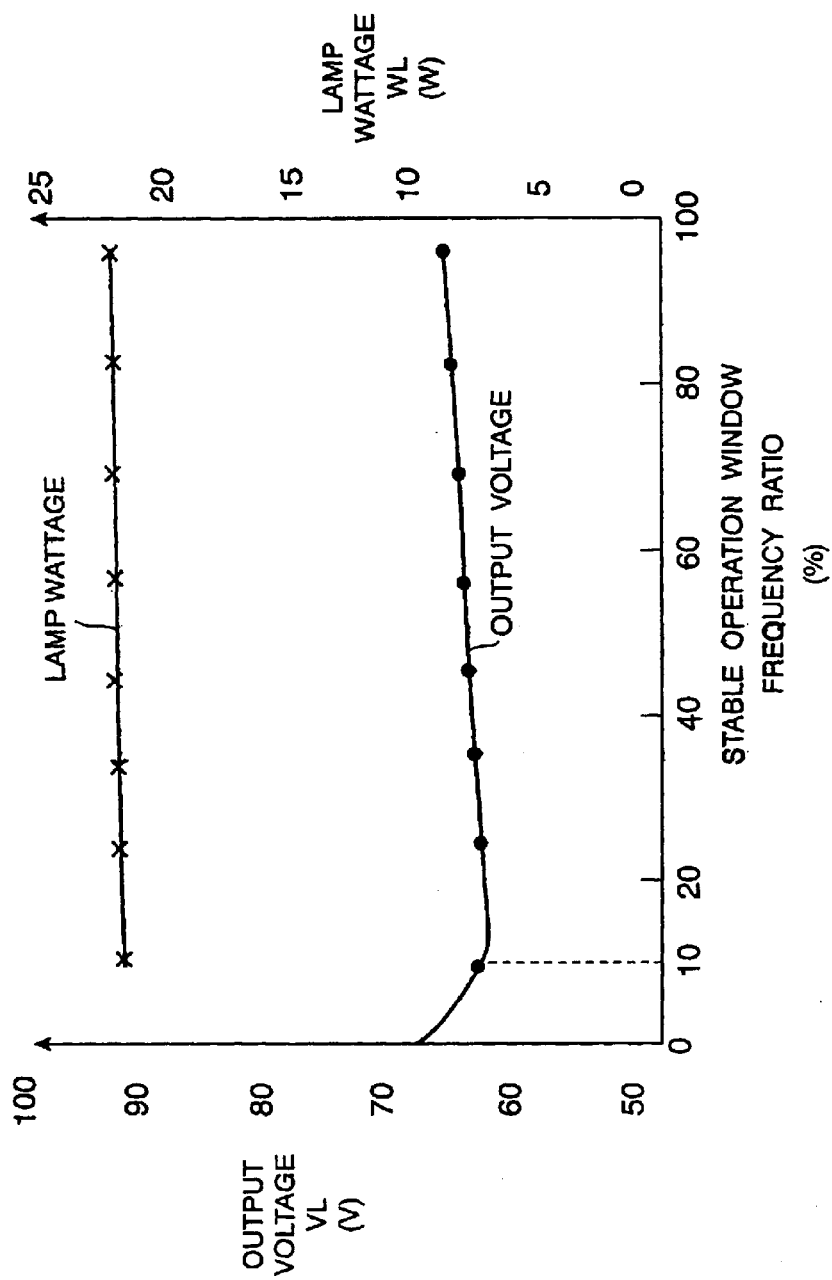
FIG. 7 is a graph showing relations of a stable operation window frequency ratio to a lamp voltage and a lamp power.

Referring now to FIG. 7, a time ratio control characteristics of a high-pressure discharge lamp with an arc tube with a sphericity of 0.53–0.84, and an inner diameter of 2.0–6.0 mm will be explained.

In FIG. 7, a relation of a lamp voltage VL to the ratio R of the operating time in the first frequency in the cycle T (hereinafter referred to as "first frequency operation ratio") and a relation of a lamp power WL to the first frequency operation ratio R are presented. Herein, a first frequency is assigned to 45 kHz in the first stable operation window and the second frequency is assigned to 90 kHz in an astable operation window.

As shown in FIG. 7, when the ratio R is in the range of 0–10%, the lamp voltage VL varies almost steeply. On the other hand, when the ratio R is in the range of 10–100%, the lamp voltage VL varies gradually. Furthermore, when the ratio R is in the range of 10–100%, the lamp power WL is almost kept in constant. Therefore, it is preferred to set the ratio R in the range of 10–100% for the high-pressure discharge lamp having such an arc tube defined as above.

Figure 8:
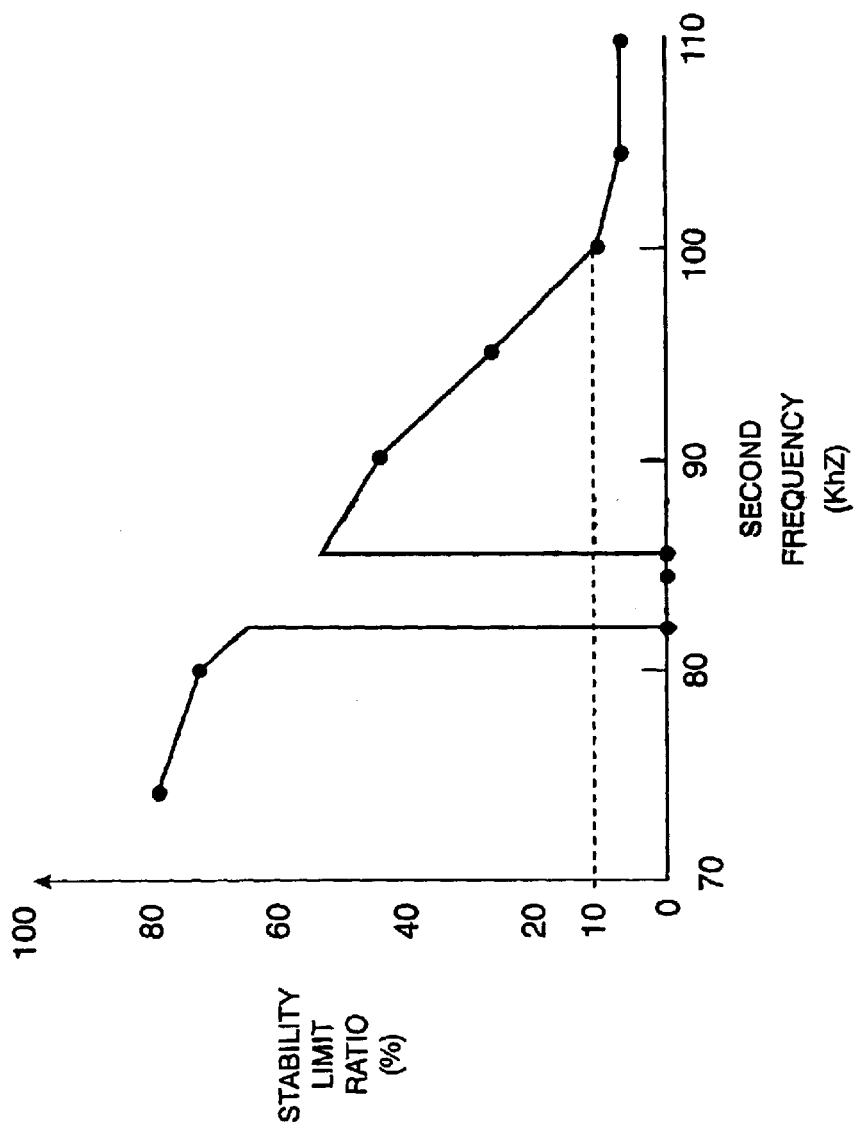
FIG. 8 is a graph showing a relation between a stability limit ratio of an arc tube with a low sphericity and the second frequency.

Referring now to FIG. 8, a time ratio control characteristics of a high-pressure discharge lamp with an arc tube with a sphericity of 0.53 or less will be explained. In FIG. 8, a relation of a stability limit ratio Rsl of the operation time at the first frequency to the cycle T to the second frequency is presented. Herein the first frequency is assigned to 45 kHz in the first stable operation window and the second frequency is varied in the range of 75–110 kHz. As shown in FIG. 8, when the second frequency is in the range of 75–82 kHz, the stability limit ratio Rsl varies from 80% to 65%. This means that the ratio R of the operation time of the first frequency in the stable operation window in the cycle T is required in the range of 65–80%. Furthermore, when the second frequency is the range of 86–110 kHz, the stability limit ratio Rsl is 10–65%. This means that the ratio R is required to be in the range of 10–55%. By the way, when the second frequency is in the range of 82–86 kHz, the stability limit ratio Rsl is 0%. This means that the ratio R may be 0%. This is because that the frequency range of 82–86 kHz is in the second stable operation window of the high-pressure discharge lamp 12. Accordingly, in the high-pressure discharge lamp having an arc tube with a sphericity of 0.53 or less, the ratio R depends at the second frequency in an astable operation window. By the way, when the second frequency is assigned to 100 kHz or more, and the lamp power during the operating at the second frequency is set small, the ratio R can be made to 10%. This means that the second frequency can be assigned to any high frequency out of stable operation window unless causing unintentional turn-out of the discharge lamp, and the ratio R can be set in the range of 10–100%.

When the ratio of the lamp power W1 in the operation time at the first frequency and the lamp power W2 in the operation time at the second frequency is given by an equation of "W1/W2≧2.0", the time difference of the operating in the first frequency and the operating time in the second frequency is comparatively decreased, and thus the lamp power can be kept in constant. That is, the ratio of the operating time at the frequency in the first stable operation window increases, and more stable operation is attained.

Now, operation powers for the inverter controller 22 and the time ratio controller 20 will be explained. The time ratio controller 20 and the inverter controller 22 are respectively driven by exclusive circuits. The time ratio controller 20 is started up after the inverter controller 22 has started.

The time ratio controller 20 operates in response to a lamp voltage detected by a lamp wattage detector 21 (see FIG. 1).

When the lamp voltage exceed a predetermined value, the time ratio controller 20 controls the inverter controller 22 to oscillate at the second frequency which is in the second stable operation window or higher than the second stable operation window. Therefore, even if the time ratio controller 20 is in operation, the high-pressure discharge lamp 12 can be started. On the other hand, if the second frequency is selected immediately after the high-pressure discharge lamp has started, the operating power supplied to the high-pressure discharge lamp will decrease. If the power supplied to the high-pressure discharge lamp immediately after the start high-pressure discharge lamp is little, electrodes in the arc tube are not heated enough and thus there arises a problem that a sputtering of electrode material trails for a long time.

Therefore, after the high-pressure discharge lamp 12 is started by the inverter controller 22 and operating at the frequency in the first stable operation window frequency, the time ratio controller 20 is started up. The timings of starting the inverter controller 22 and the time ratio controller 20 are managed by start-up rates of respective drivers.

Figure 9:
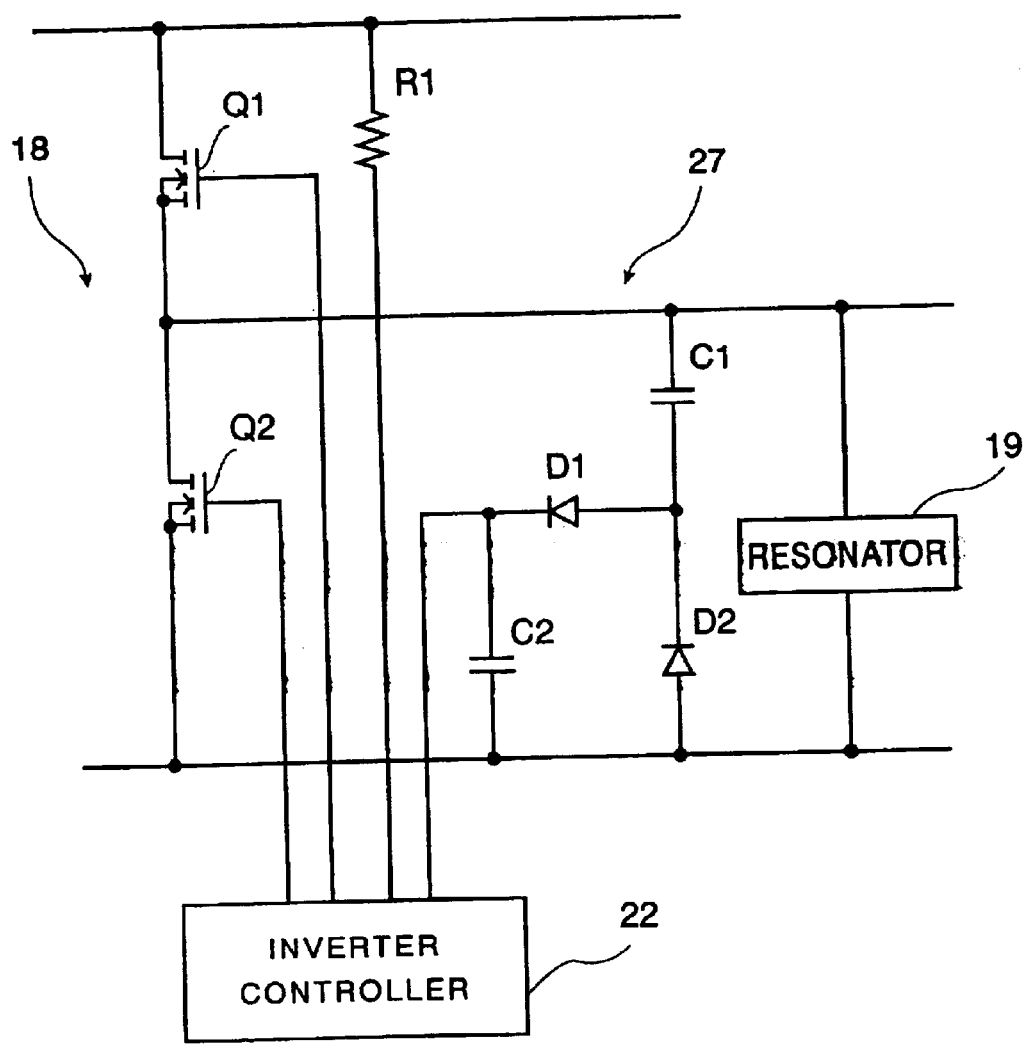
FIG. 9 is a circuit diagram showing a circuit for supplying an operating power to an inverter controller.

Referring now to FIG. 9, a driver of the inverter controller 22 will be explained. The driver is constituted by using a switching snubber 27 for the inverter 18. The switching snubber 27 is located on the AC path from the inverter 18. The switching snubber 27 is comprised of a capacitor C1. The switching snubber 27 principally operates to reduce the switching loss of the inverter 18 by slowing the waveform rising rate of the high frequency AC. An operating power for the inverter controller 22 is drawn through a circuit comprised of two diodes D1, D2 and a capacitor C2. When the lower stage switching element Q2 of the inverter 18 is turned off, the capacitors C1 and C2 are charged, and thus a voltage arises across the capacitor C2. The voltage across the capacitor C2 can be used for starting the inverter controller 22. Therefore, the inverter controller 22 is started after the inverter 18 has been started. The inverter controller 22 makes start the operations of the switching elements Q1 and Q2 through a resistor R1. After that, the inverter controller 22 is steadily supplied its operating power from the switching snubber 27.

Figure 10:
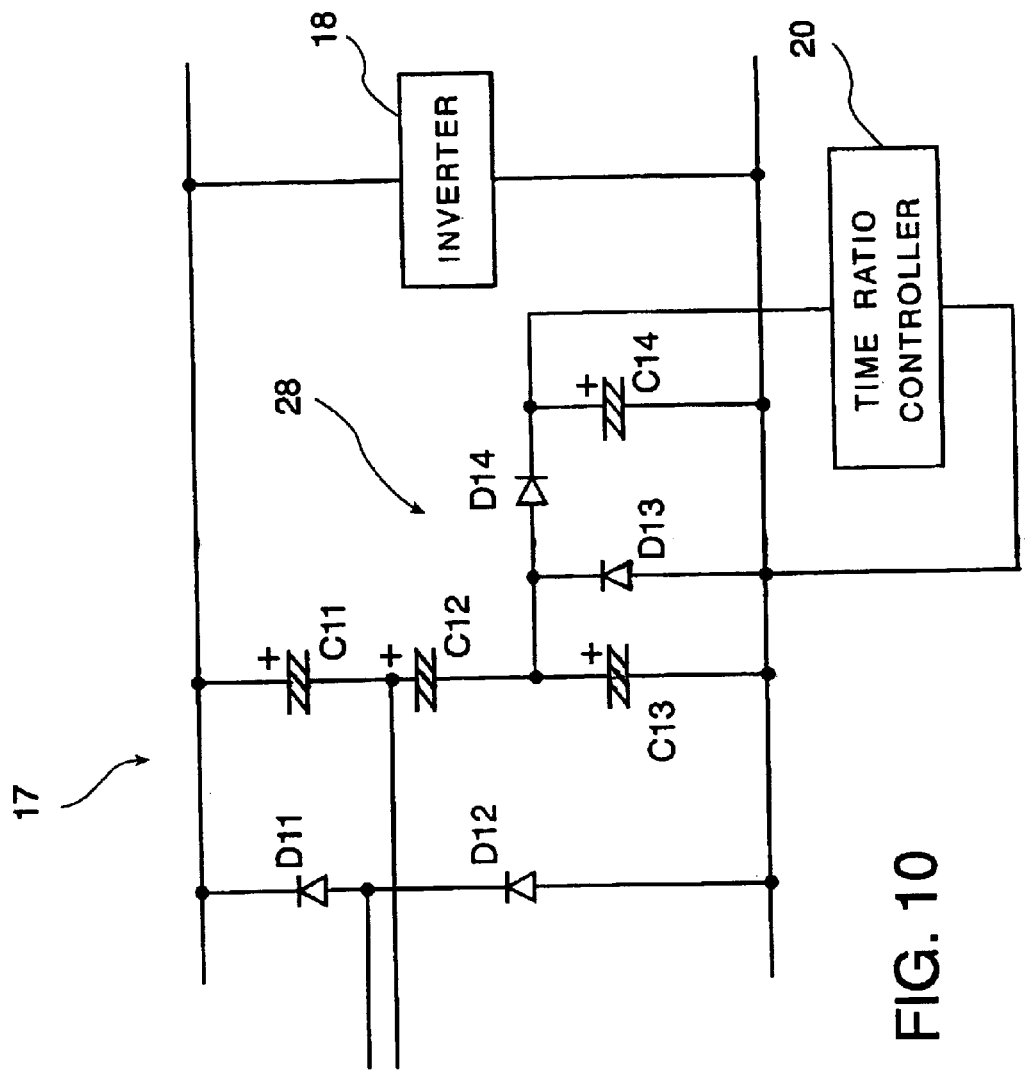
FIG. 10 is a circuit diagram showing a circuit for supplying an operating power to a time ratio controller.

Referring now to FIG. 10, a driver of the time ratio controller 20 will be explained. The driver of the time ratio controller 20 is constituted by using a charge and discharge circuit 28 for a smoothing capacitor in the rectifier 17. The rectifier 17 rectifies the AC fed through the AC inlet 16 by diodes D11 and D12 to convert into the DC. The DC is then smoothed by smoothing capacitors C11, C12, and C13. The charge and discharge circuit 28 for drawing the operating power of the time ratio controller 20 is comprised of two diodes D13, D14 and a capacitor C14. After the operating current of the inverter 18 has increased, a current flowing in the smoothing capacitors C11, C12, and C13 in the rectifier 17 increases. Therefore, the voltage across the capacitor C14 also increases enough to operate the time ratio controller 20 at this time. Therefore, the voltage across the capacitor C14 can be used for starting the time ratio controller 20. That is, the time ratio controller 20 is started after the AC power supplied to the high-pressure discharge lamp 12 has sufficiently increased.

Here, in place of the charge and discharge circuit 28 for the smoothing capacitor of the rectifier 17, the operating power can be obtained from the capacitor of the resonator 19. In this case, since the waveform rising rate of the current flowing through resonator 19 is steep, a delay circuit is inserted for delaying the operation of the time ratio controller 20. Thus, the DC section and the AC section of the inverter 18 can be used for supplying powers to the inverter controller 22 and the time ratio controller 20. Therefore, those drivers are simplified and the operations of the inverter controller 22 and the time ratio controller 20 can be ensured.

Now, a range of the lamp voltage of the high-pressure discharge lamp 12 in connection with the operation of the time ratio controller 20 will be explained. In order to prevent a capacitive oscillation, the time ratio controller 20 operates unless the lamp voltage operates in the range which does not exceed a value at the time that the lamp power becomes maximum in the operating state at the first frequency. In case that the lamp voltage exceed a value at the time that the lamp power is maximum, the high-pressure discharge lamp lighting apparatus 11 operates at only the second frequency.

Figure 11:
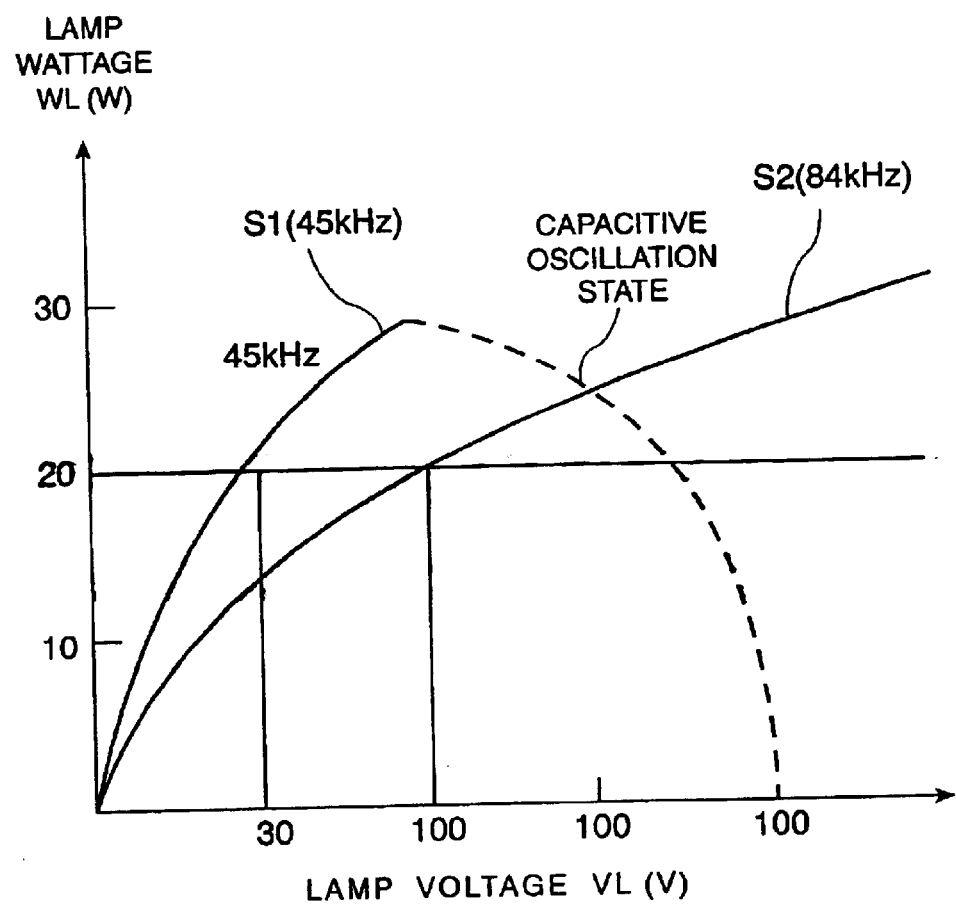
FIG. 11 is a graph illustrating operation characteristics of the high-pressure discharge lamp lighting apparatus in two lighting frequencies.
Figure 12A:
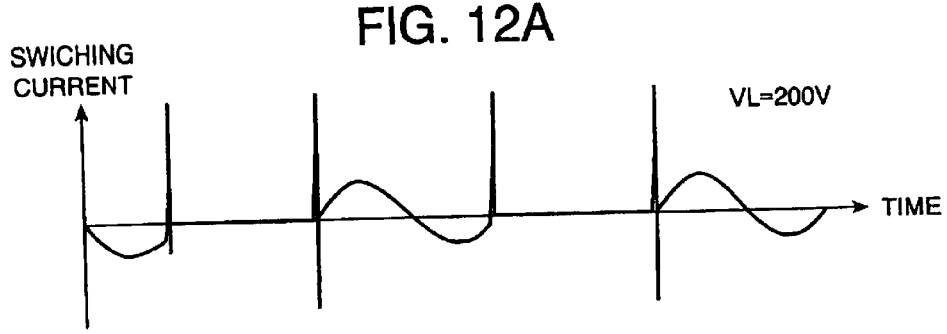
FIGS. 12A to 12D are waveform diagrams of switching currents at a variety of lamp voltages for explaining a capacitive oscillation of the inverter.
Figure 12B:
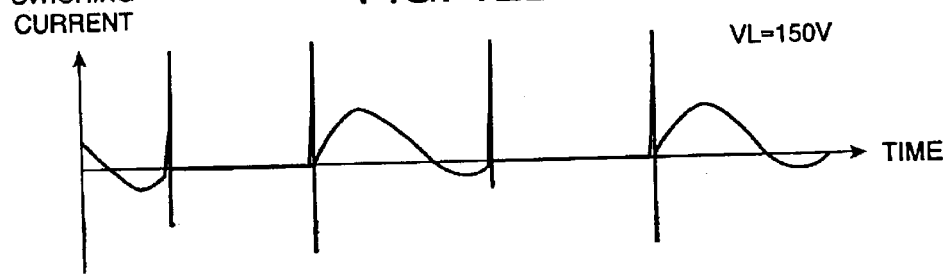
Figure 12C:
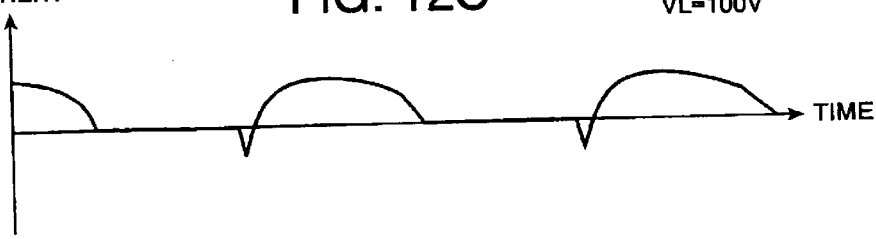
Figure 12D:
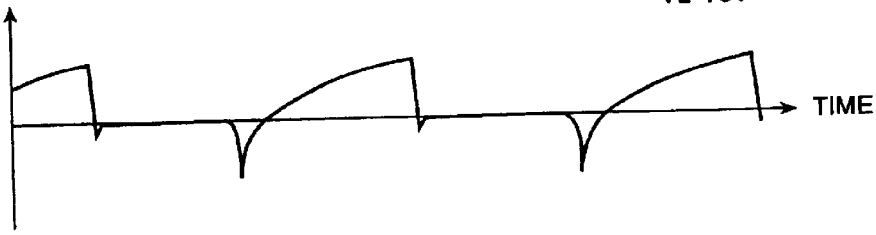
Figure 13:
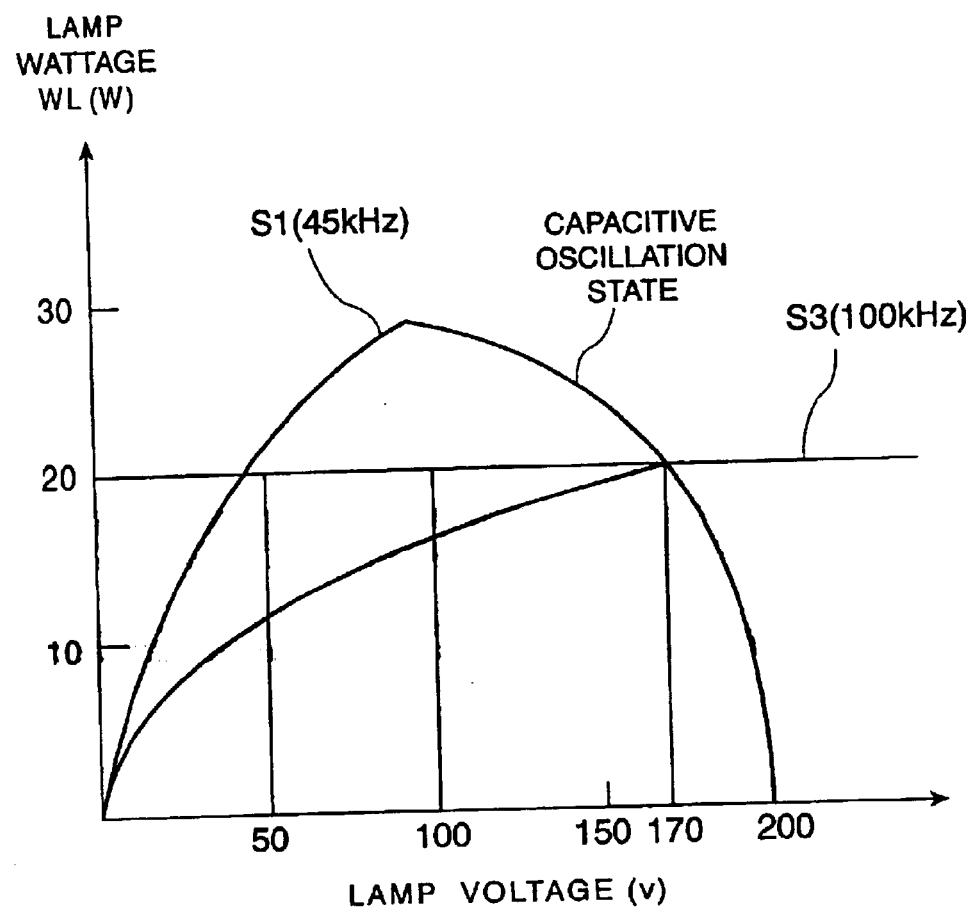
FIG. 13 is a graph illustrating operation characteristics for explaining an exemplified time ration control of the high-pressure discharge lamp lighting apparatus.
Figure 14:
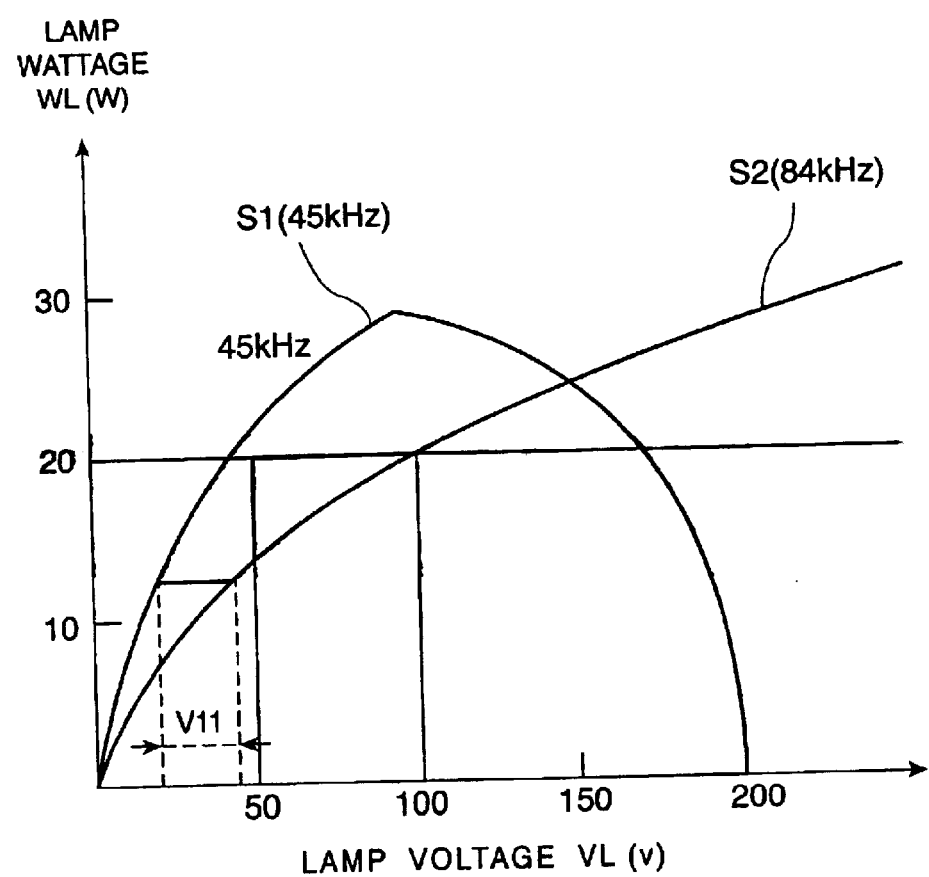
FIG. 14 is a graph illustrating operating characteristics of the high-pressure discharge lamp lighting apparatus with a resonance frequency two to three times the first frequency.
Figure 15A:
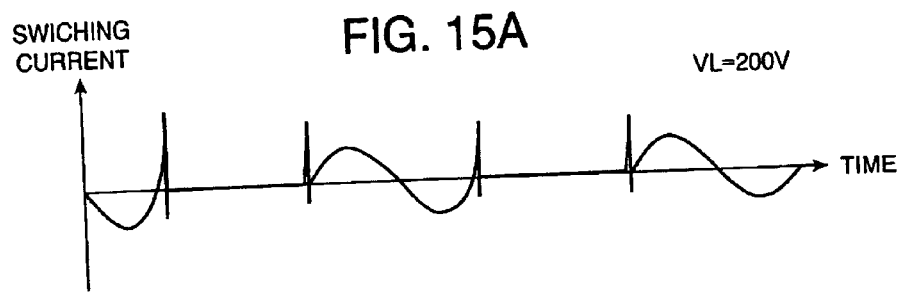
FIGS. 15A to 15D are waveform diagrams of a switching current at a variety of lamp voltages at a tertiary oscillation state.
Figure 15B:
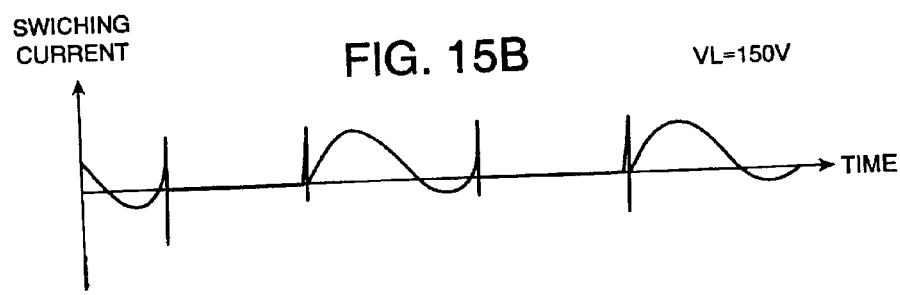
Figure 15C:
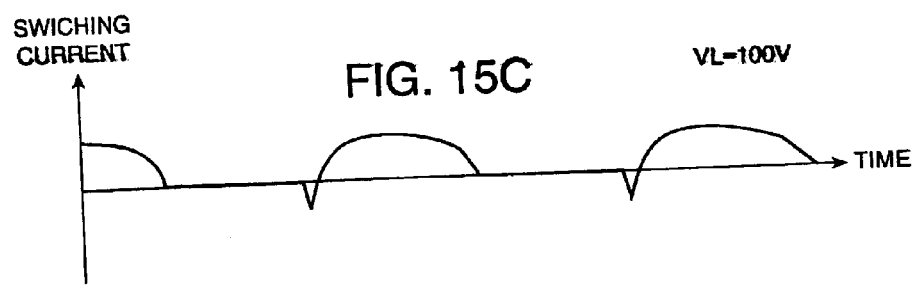
Figure 15D:
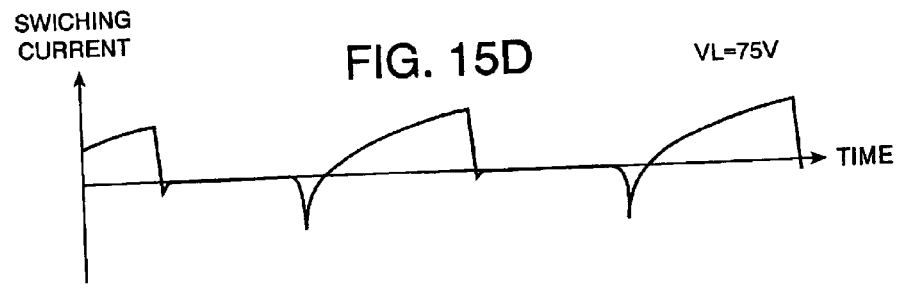

Referring now to FIGS. 11 to 15, the operation of the high-pressure discharge lamp lighting apparatus 11 will be explained. FIGS. 11, 13 and 14 show the load characteristics of the inverter 18. In these graphs, the vertical axis indicates the lamp power WL, while the horizontal axis indicates the lamp voltage VL. S1 denotes a characteristic curve at the time of operation at the first frequency, 45 kHz. S2 denotes a characteristic curve in an operation at the second frequency, 84 kHz, in the second stable operation window, or the resonance frequency of the resonator. As seen from the characteristic curve S1, in the operation at the first frequency, 45 kHz, the lamp voltage VL increases steeply. When the lamp voltage VL exceeds 100V, the operation of the inverter 12 goes to a capacitive oscillation state, as shown in FIGS. 12A to 12D.

Therefore, the time ratio is controlled so that the lamp voltage VL does not exceed 100V at the time that the lamp power becomes maximum in the operating at the first frequency, as shown in FIG. 13. FIG. 13 illustrates the load characteristics of the inverter 18 at the time that the time ratio is controlled for the lamp voltage VL in the range of 50–100 V. When the lamp power with which the time ratio controller 20 starts its operation is set to 17 W, in the voltage range V11 from a voltage where the characteristic curve S1 exhibits 17 W to a voltage where the characteristic curve S2 exhibits 17 W the time ratio controller 20 repeatedly executes its action and quits the action. Thereby the lamp power is kept around 17 W. When the lamp voltage is in the range of 50–100 V, the time ratio controller 20 will optimally operate. When the lamp voltage is exceeds 100 V at the time that the lamp power becomes maximum, the high-pressure discharge lamp lighting apparatus operates at the second frequency, and the lamp voltage VL is controlled along the characteristic curve S2. Thereby, the high-pressure discharge lamp lighting apparatus is prevented from a reduction of efficiency due to the capacitive oscillation and the switching loss.

By the way, when the resonance frequency of the resonator 19 is set to two to three times the first frequency, 45 kHz, the switching current goes to a tertiary resonance state but not to the capacitive oscillation state, even if the lamp voltage VL increases. Therefore, the high-pressure discharge lamp lighting apparatus 11 is able to carry out inductive switching operations.

FIG. 14 illustrates the load characteristics of the high-pressure discharge lamp lighting apparatus 11 at the time that the resonance frequency of the resonator 19 is set to two to three times the first frequency, 45 kHz. S3 denotes a characteristic curve at the time of operation at a frequency, 100 kHz, in the second stable operation window, or the resonance frequency of the resonator. As seen from the characteristic curve S1, in the operation at the first frequency, 45 kHz, the lamp voltage VL increases, as shown in FIG. 15. Consequently, even if the lamp voltage VL exceeds 100 V, the switching current goes to a tertiary resonance state but not to the capacitive oscillation state, even if the lamp voltage VL increases, as shown in FIGS. 15A to 15D.

Therefore, even if it is a case of lighting the high-pressure discharge lamp 12 whose lamp voltage at the time that the lamp power becomes maximum is 100 V or more, the time ratio control is performed. As to the characteristic curve S3 at the time of operation at a second frequency, 100 kHz, when the lamp voltage VL becomes 170V or more, the lamp power WL is kept in constant at 20 W. Therefore, the upper limit of the lamp voltage in relation to the time ratio control by the time ratio controller 20 is 170 V. At the lamp voltage VL above 170 V, there arises a problem that the lamp power is not controlled to a predetermined value. Therefore, when the resonance frequency is set to two to three times the first frequency, 45 kHz, it is possible to carry out the time ratio control even for the high-pressure discharge lamp whose lamp voltage becomes a value at the time that the lamp power becomes maximum in the operation at the first frequency, and thus the applicable scope of the time ratio control is remarkably widened.

Figure 16:
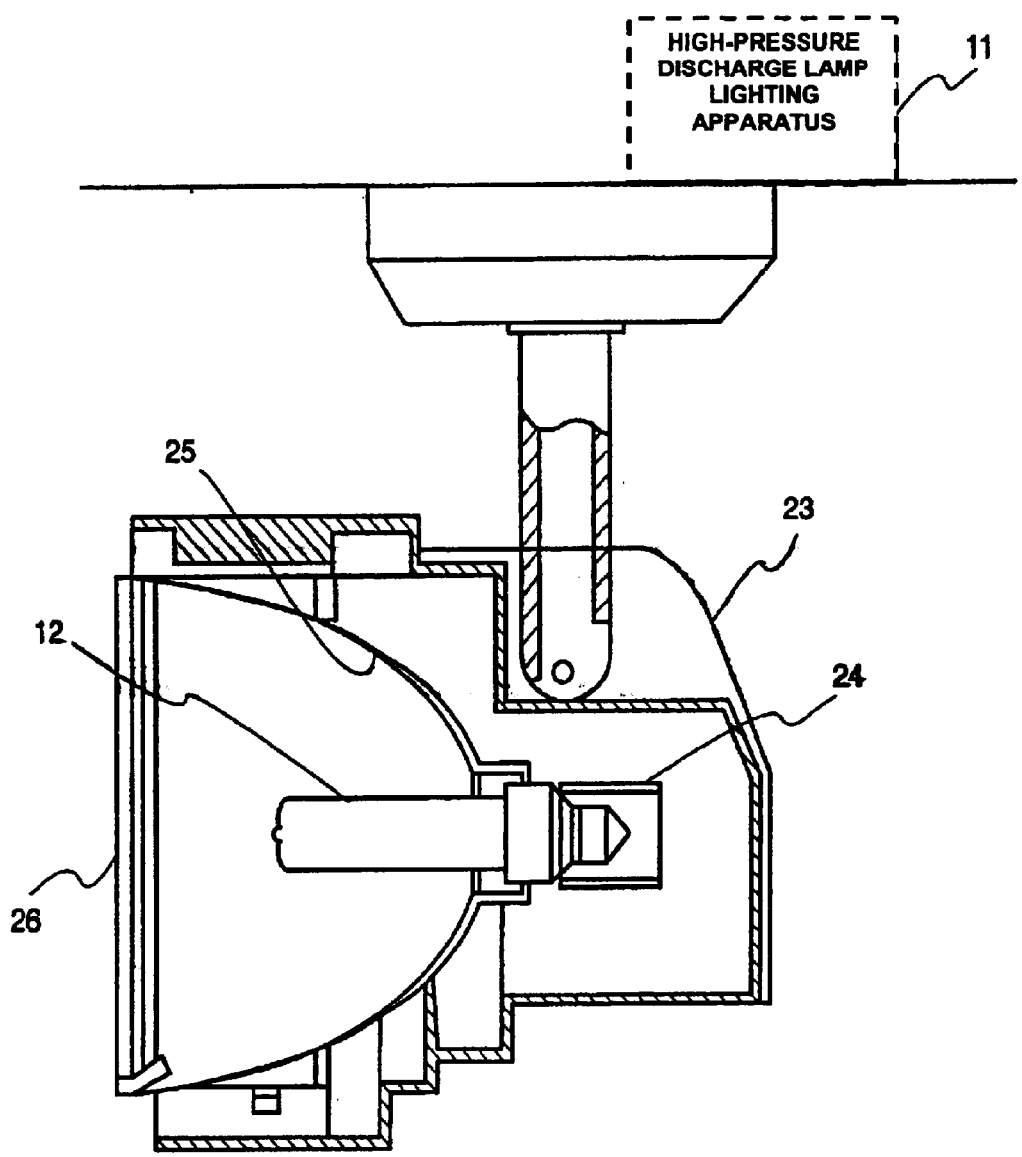
FIG. 16 is a section showing the luminaire according to the present invention.

Referring now to FIG. 16, a lumunaire according to one aspect of the present invention will be explained. As shown in FIG. 16, the luminaire is comprised of the high-pressure discharge lamp lighting apparatus 11 having the features as explained above, an appliance 23 for accommodating the high-pressure discharge lamp lighting apparatus 11 and the high-pressure discharge lamp 12.

As shown in FIG. 16, the high-pressure discharge lamp 12 is loaded to the socket 24 of the appliance 23, and then operated by the high-pressure discharge lamp lighting apparatus 11. The light radiated from the high-pressure discharge lamp 12 is reflected at a reflector 25 in front of the high-pressure discharge lamp 12 and then projected through a front glass 26. According to the embodiment of the present invention, the luminaire having the effects of the high-pressure discharge lamp lighting apparatus 11 as described above.

As described above, the present invention can provide an extremely preferable high-pressure discharge lamp lighting apparatus and a luminaire thereof.

In the high-pressure discharge lamp lighting apparatus according to the first aspect of the present invention, the ratio of the operation time at the first frequency and the operation time at the second frequency can be adjusted to adequately control the lamp power. Consequently, boosters are not necessary. Furthermore, the high-pressure discharge lamp lighting apparatus can be reduced cost and size thereof, and also simplified its construction. According to this aspect of the present invention, an occurrence of the acoustic resonance in a high-pressure discharge lamp can be prevented more definitely.

According to this aspect of the present invention, options of the second frequency can be highly increased. Therefore, the flexibility of designing the high-pressure discharge lamp lighting apparatus increases. When one of the frequencies is contained in a stable operation window, neither a curvature of arc nor a flickering occurs, even though the other frequency is the frequency of causing acoustic resonance. As the lamp current at the first frequency is larger than the lamp current at the second frequency, a curvature of arc or a flickering becomes hard to occur.

According to the fourth aspect of the present invention, the high-pressure discharge lamp lighting apparatus can output a sufficiently high voltage. Therefore, unintentional turn-out of the high-pressure discharge lamp resulted from lowering of the lamp power can be prevented.

According to the fifth aspect of the present invention, the high-pressure discharge lamp can be lit up immediately after starting the high-pressure discharge lamp at the frequency in the stable operation window which can control lamp power low. Therefore, the stress resulting from the curvature of arc etc. does not occur in the arc tube of a high-pressure discharge lamp immediately after starting.

According to the sixth aspect of the present invention, the ratio of the first frequency can be set up according to the type and the property of the high-pressure discharge lamp, and the high-pressure discharge lamp can be appropriately started.

According to the seventh aspect of the present invention, the time difference between the operating time in the first frequency and the operating time in the second frequency relatively decreases. Therefore, the fluctuation of the lamp power during lighting can be decreased.

According to the sixth aspect of the present invention, the ratio of the operating time at the first frequency increases. Therefore, it becomes possible to turn on the high-pressure discharge lamp stably.

According to the eighth aspect of the present invention, since the two-operations alternating frequency is set to 100 Hz or more, the ripple of the lamp current beyond is beyond human visibility in great deal and thus flickers of the discharge lamp are not sensed by human eyes.

Since the two-operations alternating frequency is made lower than into the first frequency, the lamp power can be appropriately controlled.

According to the ninth aspect of the present invention, even if the high-pressure discharge lamp having a high lamp voltage it is able to prevent a capacitive oscillation during the time ratio control and a degradation of efficiency due to a switching loss.

According to the tenth aspect of the present invention, even the high-pressure discharge lamp which has the lamp voltage higher than the lamp voltage from which lamp power becomes maximum by the operating state in the first frequency, the time ratio control can be performed, and the possible range of time ratio control can be made large.

According to the eleventh, twelfth, and thirteenth aspects of the present invention, the time ratio controller is held non-operating state until the high-pressure discharge lamp is lit up. Therefore, the high-pressure discharge lamp lighting apparatus can optimally change the lamp power of the high-pressure discharge lamp until it results in lighting.

According to the fourteenth and fifteenth aspects of the present invention, since the drive power source of the inverter controller or the time ratio controller can be supplied from the circuit which constitutes the high-pressure discharge lamp lighting apparatus, a circuit configuration becomes easy and can supply a drive power source stably.

According to the sixteenth and seventeenth aspects of the present invention, since the drive power source of the inverter controller or a time ratio controller can be supplied from the circuit which constitutes the high-pressure discharge lamp lighting apparatus, a drive power source can be supplied stably, without complicating a circuit configuration.

According to the eighteenth aspect of the present invention, the luminaire which has an effect by the high-pressure discharge lamp lighting apparatus according to any one aspect of the present invention is achieved.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high-pressure discharge lamp lighting apparatus, comprising:
    a DC power source;
    an inverter for converting a DC supplied from the DC power source to an AC;
    an AC path for transmitting the AC output from the inverter to a high-pressure discharge lamp;
    a resonator having a predetermined resonance frequency, and interposed in the AC path;
    an inverter controller for controlling the inverter according to its variable frequency oscillation function by selectively impressing a first frequency in a stable operation window free from causing acoustic resonance in the high-pressure discharge lamp, and a second frequency higher than the first frequency to the inverter;
    a lamp wattage detector for detecting a lamp wattage of the high-pressure discharge lamp from a voltage across the high-pressure discharge lamp and a current flowing through the high-pressure discharge lamp; and
    a time ratio controller for controlling a time ratio of an operation time at the first frequency and an operation time at the second frequency of the inverter controller so that the inverter outputs are alternately impressed to the high-pressure discharge lamp at an adequate time at the first frequency and the second frequency, said time ratio being based on a lamp voltage of the discharge lamp detected in the steady lighting state using the lamp wattage detector.

2. A high-pressure discharge lamp lighting apparatus as claimed in claim 1, wherein the second frequency being the frequency in other stable operation windows free from causing the acoustic resonance in the high-pressure discharge lamp.

3. A high-pressure discharge lamp lighting apparatus as claimed in claim 1, wherein the second frequency being the frequency in an astable operation window in which acoustic resonance occurs with the high-pressure discharge lamp.

4. A high-pressure discharge lamp lighting apparatus as claimed in claim 1, wherein the second frequency generally corresponds with the resonance frequency of the resonator.

5. A high-pressure discharge lamp lighting apparatus as claimed in claim 1, wherein the inverter controller outputs frequency corresponding to the resonance frequency of the resonator in general at a time of starting the high-pressure discharge lamp, and operating the inverter.

6. A high-pressure discharge lamp lighting apparatus as claimed in claim 1, wherein a time ratio of the first frequency is set at a range which is 10–100% in the time ratio controller.

7. A high-pressure discharge lamp lighting apparatus as claimed in claim 1, wherein the time ratio controller controls the time ratio of an operation time at the first frequency and an operation time at the second frequency of the inverter controller so that the ratio of a lamp power W1 of the high-pressure discharge lamp during lighting at the first frequency and a lamp power W2 of the high-pressure discharge lamp during lighting at the second frequency is given by an equation; $W1/W2 \geqq 2.0$.

8. A high-pressure discharge lamp lighting apparatus as claimed in claim 1, wherein a two-operations alternating frequency is equal to or higher than 100 Hz and lower than the first frequency.

9. A high-pressure discharge lamp lighting apparatus as claimed in claim 1, wherein the time ratio controller controls the time ratio of an operation time at the first frequency and an operation time at the second frequency of the inverter controller so that the lamp voltage of the high-pressure discharge lamp does not exceed a voltage at a time that the lamp power becomes maximum in the operation at the first frequency.

10. A high-pressure discharge lamp lighting apparatus as claimed in claim 1, wherein the resonance frequency of the resonator is set to two to three times the first frequency, and the time ratio controller controls the time ratio of an operation time at the first frequency, and an operation time at the second frequency of the inverter controller so that the lamp voltage does not exceed a voltage at a time that the lamp voltage in the operation at the second frequency reaches a prescribed value.

11. A high-pressure discharge lamp lighting apparatus as claimed in claim 1, wherein the time ratio controller starts after the inverter has started.

12. A high-pressure discharge lamp lighting apparatus as claimed in claim 11, wherein the DC power source has a rectifier for rectifying a commercial AC power source, and the time ratio controller is supplied its operating power from a smoother associated to the rectifier.

13. A high-pressure discharge lamp lighting apparatus as claimed in claim 11, wherein the time ratio controller is supplied its operating power from the resonator.

14. A high-pressure discharge lamp lighting apparatus as claimed in claim 1, wherein the time ratio controller starts after the inverter controller has started.

15. A high-pressure discharge lamp lighting apparatus as claimed in claim 14, wherein an operating power of the inverter controller is supplied from the switching snubber associated to the inverter, and an operating power of the time ratio controller is supplied from the resonator.

16. A luminaire comprising:
a high-pressure discharge lamp lighting apparatus as defined by any one of preceding claims 1 to 15,
the high-pressure discharge lamp to be lit up with the high-pressure discharge lamp lighting apparatus; and
an appliance of an instrument with which it is equipped with the high-pressure discharge lamp.

17. A high-pressure discharge lamp lighting apparatus as claimed in claim 1, wherein the time ratio controller and the inverter controller have their own power sources with different start-up times, and their start timings are adjusted by the differences of those start-up times.

18. A high-pressure discharge lamp lighting apparatus as claimed in claim 1, wherein an operating power of the inverter controller is supplied from a switching snubber associated to the inverter, and an operating power of the time ratio controller is supplied from a smoother associated to a rectifier of the DC power source.

* * * * *